(12) United States Patent
Felts et al.

(10) Patent No.: US 7,031,533 B2
(45) Date of Patent: Apr. 18, 2006

(54) ENCODING METHOD FOR THE COMPRESSION OF A VIDEO SEQUENCE

(75) Inventors: Boris Felts, Marseille (FR); Marion Benetiere, Nogent sur Marne (FR); Beatrice Pesquet-Popescu, Fontenay-Sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 734 days.

(21) Appl. No.: 09/846,608

(22) Filed: Apr. 30, 2001

(65) Prior Publication Data

US 2002/0015443 A1    Feb. 7, 2002

(30) Foreign Application Priority Data

May 3, 2000    (EP) .................................. 00401216

(51) Int. Cl.
*G06K 9/36*    (2006.01)

(52) U.S. Cl. ....................................... 382/240; 382/236

(58) Field of Classification Search ................ 382/232, 382/236, 239, 240, 248; 375/240.02, 240.1, 375/240.11, 240.19, 240.24; 241/79; 348/403.1–420.1
See application file for complete search history.

(56) References Cited

FOREIGN PATENT DOCUMENTS

EP    004009320    4/2000

OTHER PUBLICATIONS

Lin W-K et al, (e.g., bandwidth) prior to connecting two networked devices, ☐packetize☐ different types of data3D Listless Zerotree Coding for Low Bit Rate Video, Oct. 1999, vol. 3 of 4, pp. 762-766.

Tham J.Y. et al, " Highly Scalable Wavelet-Based Video Codec for Very Low Bit-Rate Enviroment", vol. 16, No. 1, 1998, pp. 12-27.

Ziong Z. et al, "Multiresolution Encoding and Decoding in Embedded Image and Video Coders", vol. 6, Conf. 23, May 1998, pp. 3709-3712.

Amid Said, "A New, Fast, and Efficient Image Codec Based on Set Partitioning in Hierarchical Trees", Jun. 1996 (Abstract).

*Primary Examiner*—Yon J. Couso (57) ABSTRACT

The invention relates to an encoding method for the compression of a video sequence by means of a tridimensional wavelet transform. This method is based on a hierarchical subband encoding process leading to transform coefficients constituting a hierarchical pyramid. A spatio-temporal orientation tree, in which the roots are formed with the pixels of the approximation subband and the offspring of each of these pixels is formed with the pixels of the higher subbands, defines the spatio-temporal relationship inside said pyramid. According to the invention, the initial subband structure of the wavelet transform is preserved, in the encoding process, by scanning the subbands one after the other in an order that respects the parent-offspring dependencies formed in the tree. Moreover, flags "off/on" are added to each coefficient of the tree in view of a progressive transmission of the most significant bits of the coefficients, at least one of them describing the state of a set of pixels and at least another one describing the state of a single pixel.

11 Claims, 6 Drawing Sheets

ENCODING METHOD FOR THE COMPRESSION OF A VIDEO SEQUENCE

FIELD OF THE INVENTION

The present invention relates to an encoding method for the compression of a video sequence divided in groups of frames decomposed by means of a three-dimensional (3D) wavelet transform leading to a given number of successive resolution levels corresponding to the decomposition levels of said transform, said method being based on a hierarchical subband encoding process leading from the original set of picture elements (pixels) of each group of frames to transform coefficients constituting a hierarchical pyramid, and a spatio-temporal orientation tree—in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid.

BACKGROUND OF THE INVENTION

The expansion of multimedia applications is now making the scalability one of the most important functionalities of video compression schemes. Scalability allows delivering multiple levels of quality or spatial resolutions/frame rates in an embedded bitstream towards receivers with different requirements and encoding capabilities. Current standards like MPEG-4 have implemented scalability in a predictive DCT-based framework through additional high-cost layers. More efficient solutions based on a three-dimensional wavelet decomposition followed by a hierarchical encoding of the spatio-temporal trees like the Set Partitioning In Hierarchical Trees algorithm (SPIHT) have been recently proposed as an extension of still image coding techniques (the original SPIHT algorithm is described for instance in "A new, fast, and efficient image codec based on set partitioning in hierarchical trees", by A. Said and W. A. Pearlman, IEEE Transactions on Circuits and Systems for Video Technology, vol.6, no 3, June 1996, pp.243–250, and the extension of this algorithm to the 3D case is described for instance in "An embedded wavelet video coder using three-dimensional set partitioning in hierarchical trees (SPIHT)", B. J. Kim and W. A. Pearlman, Proceedings of Data Compression Conference, Mar. 25–27, 1997, Snowbird, Utah, USA, pp.251–260). The 3D wavelet decomposition provides a natural spatial resolution and frame rate scalability, while the in-depth scanning of the obtained coefficients in the hierarchical trees and the bitplane encoding lead to the desired quality scalability with a high compression ratio.

The SPIHT algorithm is based on a key concept: a partial sorting of the coefficients according to a decreasing magnitude, and the prediction of the absence of significant information across scales of the wavelet decomposition by exploiting self-similarity inherent in natural images. This means that if a coefficient is insignificant at the lowest scale of the wavelet decomposition, the coefficients corresponding to the same area at the other scales have a high probability to be insignificant too. Basically, the SPIHT is an iterative algorithm that consists in comparing a set of pixels corresponding to the same image area at different resolutions with a value called "level of significance" from the maximal significance level found in the spatio-temporal decomposition tree down to 0. For a given level, or bitplane, two passes are carried out: the sorting pass, which looks for zero-trees or sub-trees and sorts insignificant and significant coefficients, and the refinement pass, which sends the precision bits of the significant coefficients. The SPIHT algorithm examines the wavelet coefficients from the highest level of the decomposition to the lowest one. This corresponds to first considering the coefficients corresponding to important details located in the smallest scale subbands, with increasing resolution, then examining the smallest coefficients, which correspond to fine details. This justifies the "hierarchical" designation of the algorithm: the bits are sent by decreasing importance of the details they represent, and a progressive bitstream is thus formed.

Figure 1:
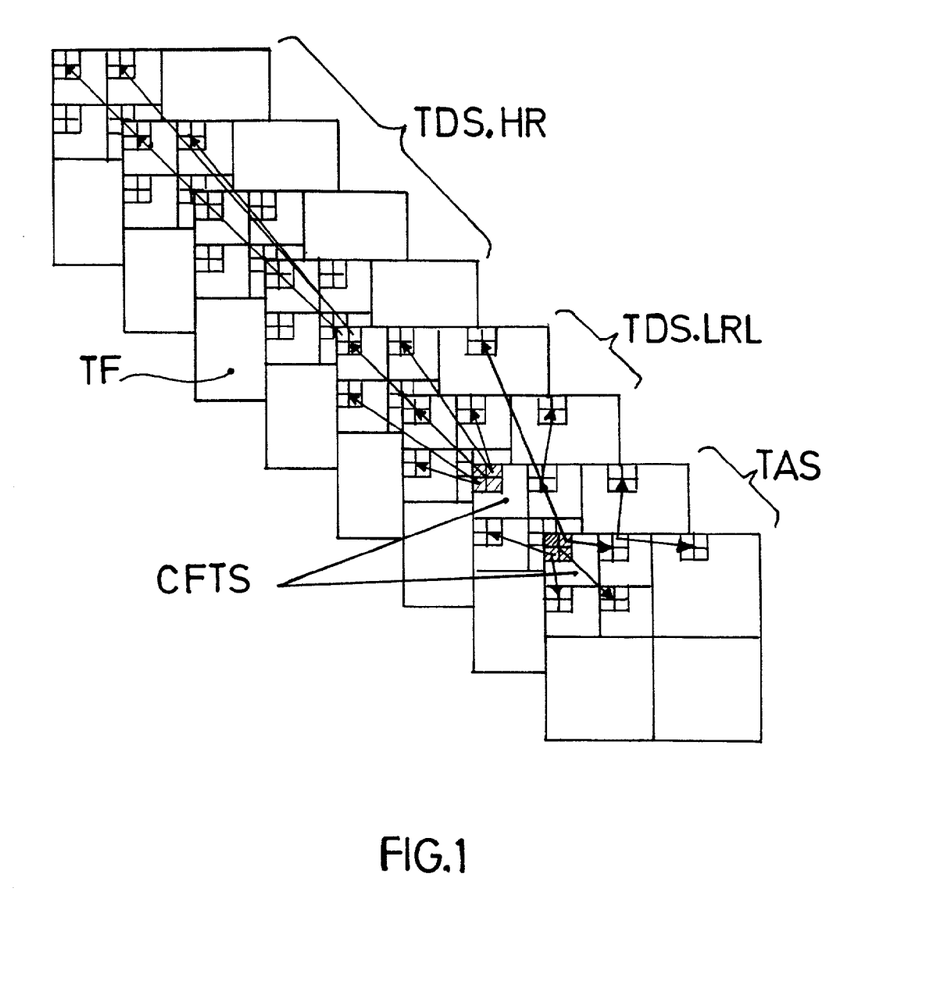
FIG. 1 gives examples of parent-offspring dependencies in the 3D case, in the spatio-temporal orientation tree.

A tree structure, called spatial (or spatio-temporal in the 3D case) orientation free, defines the spatial (or spatio-temporal) relationship inside the hierarchical pyramid of wavelet coefficients. The roots of the trees are formed with the pixels of the approximation subband at the lowest resolution ("root" subband), while the pixels of the higher subbands corresponding to the image area (to the image volume, in the 3D case) defined by the root pixel form the offspring of this pixel. In the 3D version of the SPIHT algorithm, each pixel of any subband but the leaves has 8 offspring pixels, and each pixel has only one parent. There is one exception at this rule: in the root case, one pixel out of 8 has no offspring. The following notations describe the parent-offspring relationship, an illustration of these dependencies being given in Fig.1 (three-dimensional case) where the notations are the following: TF=temporal frame, TAS=temporal approximation subband, CFTS coefficients in the spatio-temporal approximation subbands (or root coefficients), TDS.LRL= temporal detail subband at the last resolution level of the decomposition, and TDS.HR=temporal detail subband at higher resolution:

O(x,y,z): set of coordinates of the direct offspring of the node (x,y,z);
D(x,y,z): set of coordinates of all descendants of the node (x,y,z);
H(x,y,z): set of coordinates of all spatio-temporal orientation tree roots (nodes in the highest pyramid level: spatio-temporal approximation subband);
L(x,y,z)=D(x,y,z)−O(x,y,z).

The SPIHT algorithm makes use of three lists: the LIS (list of insignificant sets), the LIP (list of insignificant pixels), and the LSP (list of significant pixels). In all these lists, each entry is identified by a coordinate (x,y,z). In the LIP and LIS, (x,y,z) represents a unique coefficient, while in the LIS it represents a set of coefficients D(x,y,z) or L(x,y,z), which are sub-trees of the spatio-temporal tree. To differentiate between them, the LIS entry is of type A if it represents D(x,y,z), and of type B if it represents L(x,y,z). During the first pass (sorting pass), all the pixels of the LIP are tested and those that become significant are moved to the list LSP. Similarly, the sets of the LIS that become significant are removed from the list LIS and split into subsets that are placed at the end of the LIS and will be each examined in turn. The LSP contains the list of significant pixels to be "refined": the $n^{th}$ bit of the coefficient is sent if this one is significant with respect to the level n.

The SPIHT approach is designed to provide quality scalability associated with a high compression ratio. However, scalability in temporal or spatial resolutions cannot be obtained with this coding strategy without modifications. To improve the global compression rate of the video coding system, it is usually advised to add an arithmetic encoder to the zero-tree encoding module. In other approaches, the arithmetic coding uses pertinent contexts directly applied to the subbands for lossless image compression. Most of the time, the hierarchical and arithmetic coding modules are considered separately. To efficiently combine them in a single coding system, some modifications have to be performed on the original SPIHT algorithm.

To make the arithmetic coding efficient, it is very important to capture all the information that may have some influence on the current pixel and particularly the information related to neighbouring pixels. This information is represented by its context. The in-depth search performed when scanning for zero-trees does not exploit the redundancy inside subbands and makes harder the determination of a relevant context for the arithmetic coding. The manipulation of the lists LIS, LIP, LSP conducted by a set of logical conditions makes the order of pixel scanning hardly predictable. The pixels belonging to the same 3D offspring tree but coming from different spatio-temporal subbands are encoded and put one after the other in the lists, which has for effect to mix the pixels of foreign subbands. Thus, the geographic interdependencies between pixels of the same subband are lost. Moreover, since the spatio-temporal subbands result from temporal or spatial filtering, the frames are filtered along privileged axes that give the orientation of the details. This orientation dependency is also lost when the SPIHT algorithm is applied, because the scanning does not respect the geographic order.

Furthermore, the bits resulting from the examination of the lists LIS, LIP, LSP and the signs of the coefficients have quite different statistical properties. The relevant contexts for one list can be totally different from another. For example, as the LIP represents the set of insignificant pixels, it is reasonable to suppose that if a pixel is surrounded by insignificant pixels, it has great chance to be insignificant too, but this supposition seems bolder for the LSP: it cannot be necessarily deduced that the refinement bit of an examined pixel is one (resp. zero) if the refinement bits of its neighbours are ones (resp. zeros) at a certain level of significance.

Faced with the difficulties to add an entropy coding stage to the SPIHT algorithm, the documents that relate such an implementation are quite elusive, or even skeptical about the efficiency of the proposed solutions. Most of the time, the hierarchical coding methods and the context-based lossless image compression methods are confronted in the case of still pictures. In the case of a video sequence, the SPIHT encoding strategy is very efficient to provide a fully quality progressive bitstream with a high compression rate, but the hierarchical structure used in said strategy however does neither facilitate the insertion of a context-based adaptive arithmetic coding nor the functionality of spatial or temporal resolution scalability, which is strongly required by emerging multimedia applications.

SUMMARY OF THE INVENTION

It is therefore an object of the invention to propose a new strategy for encoding the spatio-temporal wavelet coefficients, inspired from the 3D-SPIHT, but which allows a better context selection while allowing to obtain a spatial or temporal resolution scalability in the coding scheme.

To this end, the invention relates to an encoding method such as defined in the introductive part of the description and which is moreover characterized in that:

(A) the initial subband structure of the 3D wavelet transform is preserved by scanning the subbands one after the other in an order that respects the parent-offspring dependencies formed in said spatio-temporal tree;

(B) flags "off/on" are added to each coefficient of the spatio-temporal tree in view of a progressive transmission of the most significant bits of the coefficients, these flags being such that at least one of them describes the state of a set of pixels and at least another one describes the state of a single pixel.

Although the use of lists LIS, LIP and LSP in the original SPIHT algorithm facilitates the classification task, it is an obstacle to a geographic organization of the coefficients. By using the present technique, the initial subband structure of the 3D wavelet transform is preserved, and a flag added to each coefficient indicates to which list LIS, LIP or LSP this coefficient belongs. Thus, the scanning of the lists is replaced by a subband scanning and a flag interpretation: the hierarchical and logical organization of the SPIHT is preserved, and in the same time moving a coefficient from a list to another is "virtually" done by changing its flag. The interest of this "virtual moving" is that the order of reading is not dependent of the changes performed by the logic of the SPIHT algorithm, which is particularly interesting for the refinement pass, since the refinement bits constitute the greatest part of the bitstream.

BRIEF DESCRIPTION OF THE DRAWINGS

The present invention will now be described, with reference to the accompanying drawings in which.

DETAILED DESCRIPTION OF THE INVENTION

Figure 2:
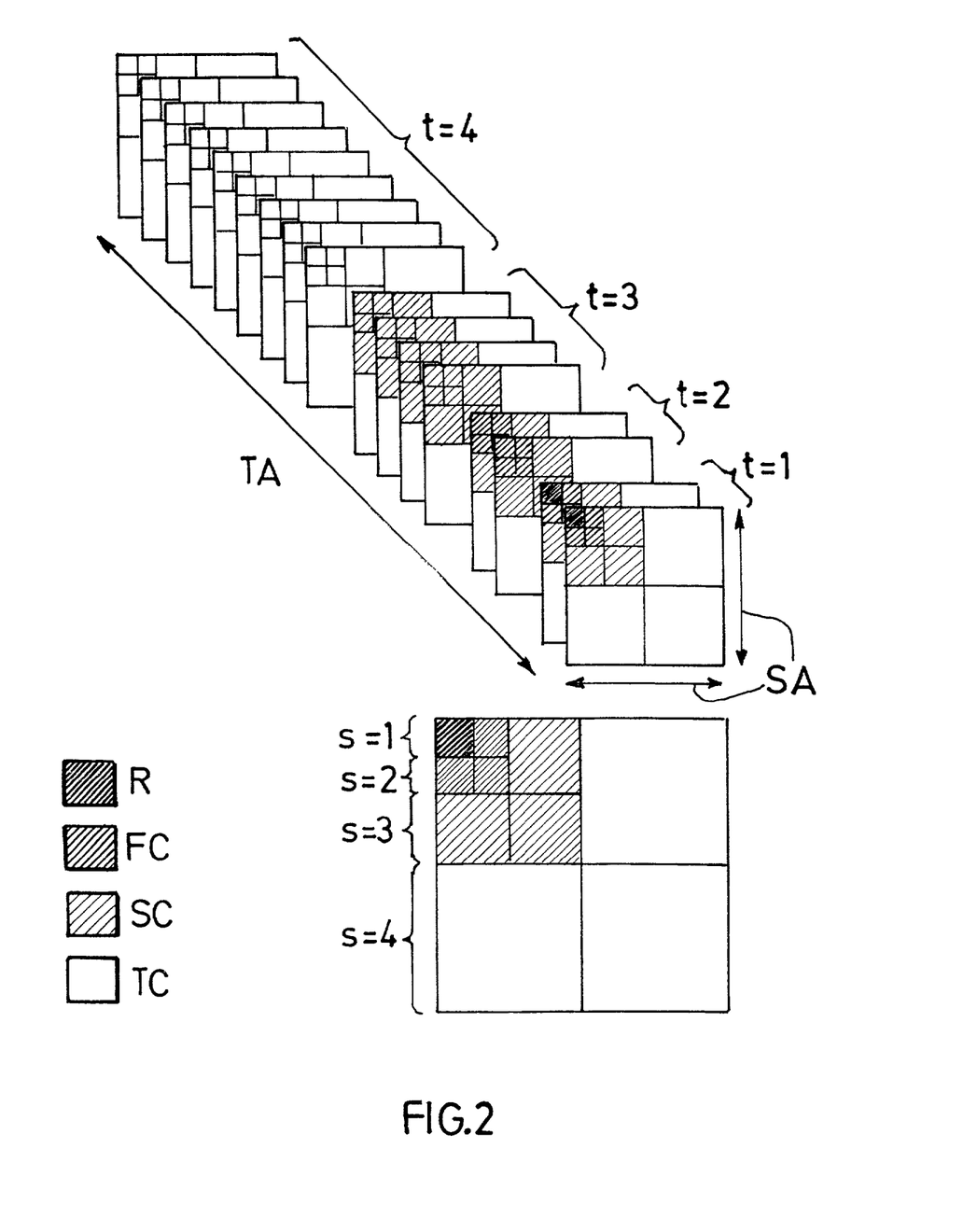
FIG. 2 illustrates the hierarchy of the subbands in said spatio-temporal tree.

In the considered method, the whole spatio-temporal tree is fully scanned for each new bitplane. At the end of the first bitplane, all the offspring dependencies of the 3D volume have been evaluated. This first scanning is therefore quite critical and must absolutely respect the calculation order of the offspring dependencies described in FIG. 2, where the notations are the following: SA=spatial (s) axes, TA=temporal (t) axis, R=roots, FC=first children, SC=second children, and TC=third children. According to the invention, the proposed algorithm scans the subbands one after the other in an order that respects the parent-offspring relationships. At least two different flags, and preferably four, are added to the coefficients of the spatio-temporal tree:

A) at least one, and preferably two of them describe the state of a set (trees or subtrees):

DIRECT$_{\_SET\_INSIG}$ (or FS1) if $D(x,y,z)$ is still insignificant;

UNDIRECT$_{\_SET\_INSIG}$ (or FS2) if $L(x,y,z)$ is still insignificant;

B) at least another one, and preferably the two other ones describe the state of a single pixel:
SIG (or FP3) if the current pixel is significant;
INSIG (or FP4) if it is not significant, or if its significance is to be analyzed (put by default to the pixels that are not included in a zero-tree).

The main steps of the algorithm implemented in the present method are:

1. Initialization:
   Put flag FP4 to all the coefficients of the lowest spatio-temporal subband;
   Put flag FS1 to 7 over 8 coefficients of the lowest spatio-temporal subband.
2. Calculate and output MSL (the maximum significance level found in the spatio-temporal decomposition tree).
3. From n=MSL down to 0, do a full exploration of the spatio-temporal tree (two main approaches are possible, as described in the following paragraph: spatially-driven resolution scalability, and temporally-driven resolution scalability), with, for each coefficient (x,y,z) of the spatio-temporal tree, the following actions:

---
a) set significance:
   1) if flag FS1 is "on", then output = $S_n$ (D(x,y,z)).
      if $S_n$ (D(x,y,z)) = 1, then:
         for each (x',y',z') ∈ O(x,y,z), put flag FP4;
         remove flag FS1 from (x,y,z);
            if L(i,j) ≠ ∅, then put flag FS2.
   2) if flag FS2 is "on", then output = $S_n$ (L(x,y,z)).
      if $S_n$ (L(x,y,z)) = 1, then:
         for each (x',y',z') ∈ O(x,y,z), put flag FS1;
            remove flag FS2 from (x,y,z).
b) pixel significance:
   1) if flag FP3 is on, then output = the $n^{th}$ bit of (x,y,z).
   2) if flag FP4 is on, then output = $S_n$ (x,y,z).
      if $S_n$(x,y,z) = 1, then:
         put flag FP3 on;
         output sign (x,y,z);
         remove flag FP4.
---

Figure 3:
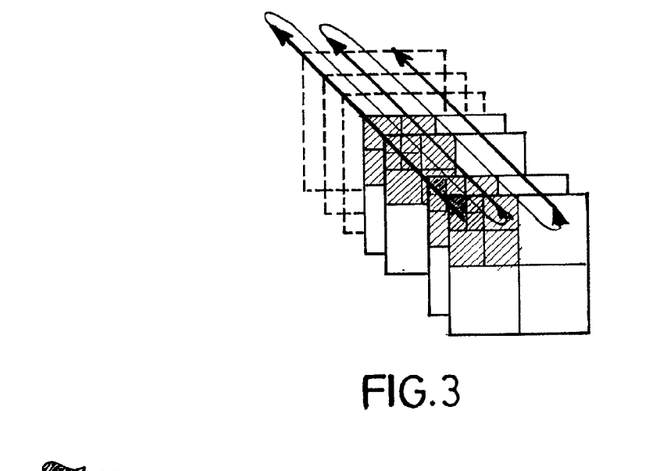
FIG. 3 shows a spatially-driven scanning of the spatio-temporal tree.
Figure 4:
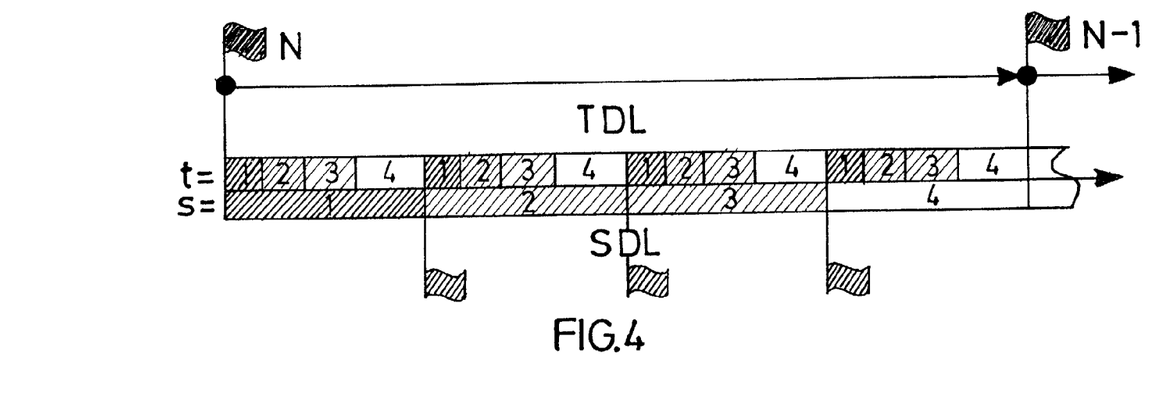
FIG. 4 depicts a bitstream organization made possible by the ordered 3D SPIHT.

The frames are filtered along privileged axes (spatial or temporal) that give the orientations of the details. These orientations can be better taken into account by scanning the subband along the same directions. Using this algorithm, there are then two main ways of exploring the spatio-temporal volume of coefficients depending on the chosen privileged orientation chosen, which may be either the spatial or the temporal axis. Consequently, two types of "multi-scalable" bitstreams may be obtained, one leaded by the spatial resolution, the second by the temporal resolution:

(A) spatially-driven resolution scalability:

For each bitplane, the tree scanning is spatially oriented, since in this scheme the spatial resolutions are fully explored one after the other as shown in FIG. 3. Inside each spatial scale, all the temporal resolutions are successively scanned. In other words, the temporal frequency is higher than the spatial one. In order to have the possibility to skip some part of the bitstream, it is necessary to introduce resolution flags in the bitstream. The scanning strategy leads to a video bitstream organized as indicated in FIG. 4, where the lines s and t correspond respectively to spatial and temporal decomposition levels (SDL and TDL), the black flags are flags separating two bitplanes, and the grey flags are flags separating two spatial decomposition levels.

Figure 5:
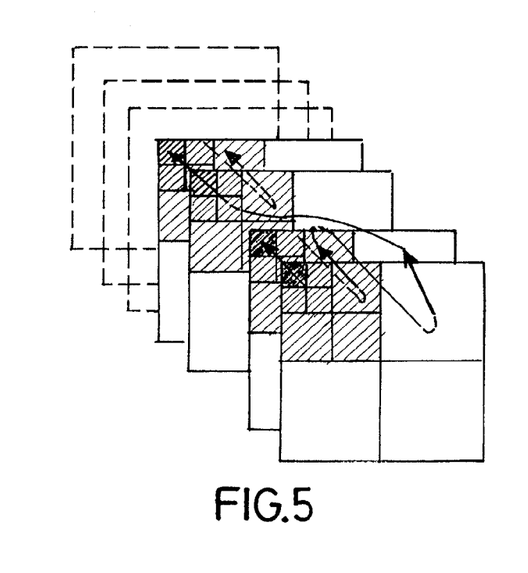
FIG. 5 shows a temporally-driven scanning of the spatio-temporal tree.
Figure 6:
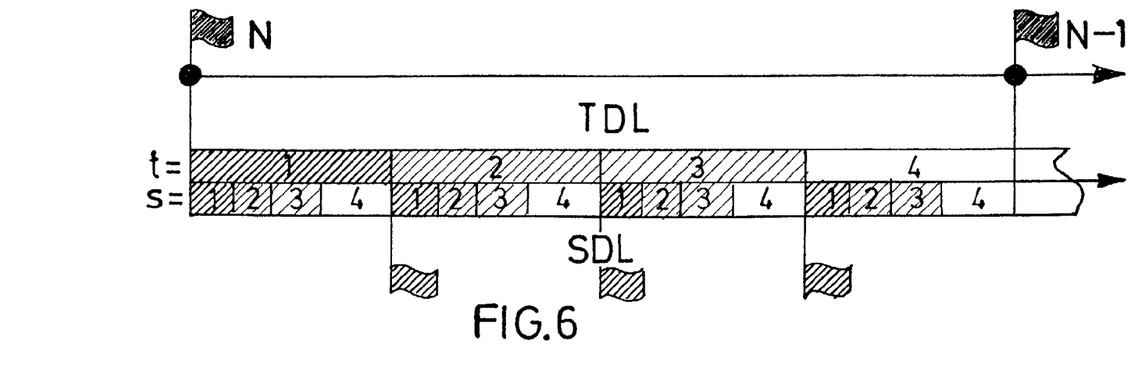
FIG. 6 depicts the structure of the bitstream obtained with said scanning.

(B) temporally-driven resolution scalability:

For each bitplane, the tree scanning is temporally oriented, since in this scheme the temporal resolutions are fully explored one after the other, as shown in FIG. 5. Inside each temporal scale, all the spatial resolutions are successively scanned and therefore all the spatial frequencies are available. This scanning strategy leads to a video bitstream organized as indicated in FIG. 6, to be compared with FIG. 4 (the grey flags are now flags separating two temporal decomposition levels). In both cases, the three types of scalability (temporal, spatial resolution, SNR) are obtained:

SNR scalability is still available since the spatio-temporal scanning is inserted in a bitplane iterative loop;

temporal and spatial scalability are provided respectively with $t_{max}$ possible frame rates and $s_{max}$ possible display sizes (t=1 to 4 and s=1 to 4 in the described examples), with t=1 corresponding to the minimum frame rate$_{min}$, and s=1 corresponding to the minimum display size.

Figure 7:
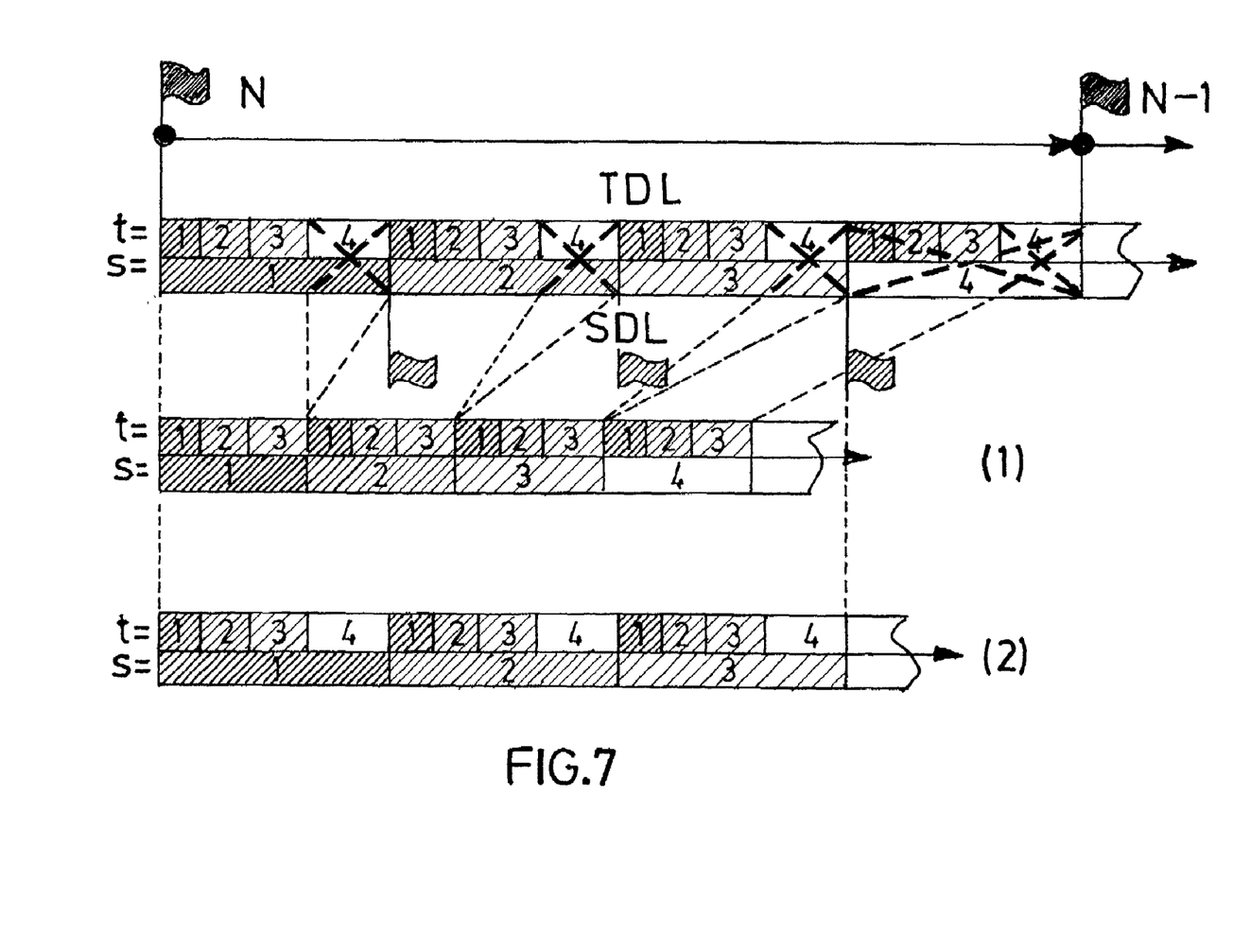
FIG. 7 illustrates a combination of SNR, spatial and temporal scalabilities using the spatially-driven scanning strategy.

An example of selective decoding is illustrated in FIG. 7.

The advantages of the implementation of the method according to the invention are the following:

(A) improvement of contexts: thanks to the fixed subband scanning and the recognition of the flags, it is possible to reestablish a coherent geographic context for each model (indeed, the SPIHT algorithm aims at reducing the redundancy between subbands of different scales, but it does not really take into account the geographic redundancy, unlike the context-based coding approaches), which is particularly interesting for the coding of the significant pixels and their refinement bits (for the significant pixels, thanks to the algorithm proposed, the same efficiency as with the SPIHT algorithm can be reached, and the rules of construction of the context are quite simple). This method better exploits the neighbouring influence on the current pixel than those which combine classical SPIHT algorithm and entropy coding, and leads to a "natural" context, directly issued from the transformed image, in conformity with the bitplane approach, and not from the bits resulting from the original SPIHT algorithm in the refinement passes. Said method should improve the compression rate, as the context is really related to the bit being encoded, but, as it scans all the subbands entirely, the computation time for the first levels is greater than with the former method.

(B) trade-off between multi-scalability and bitstream overload : the possibility to reconstruct video sequences with the desired frame rate and display sizes by extracting the corresponding fragments of the bitstream is an attractive concept, but it is obtained at the expense of coding efficiency for two main reasons:

(a) the bitstream fragments related to a particular spatial or temporal resolution need to be separated by a flag to make jumps possible. With the two scalability schemes described above, on the examples given, at least four separators are needed per bitplane, and up to 12 bitplanes are currently used to encode the wavelet coefficients.

(b) the context calculation of the adaptive arithmetic coding module must be reinitialized at the beginning of each new bitplane to ensure that any bitstream fragment will be processed at the decoder side in exactly the same conditions as at the encoder side. Therefore the multiplication of separators will unavoidably reduce the length of the consecutive bit sequences encoded by the arithmetic coding module and makes harder the probability estimation. However, as the subbands can be considered as non or partially stationary sources, this apparent drawback could be a quality.

Figure 8:
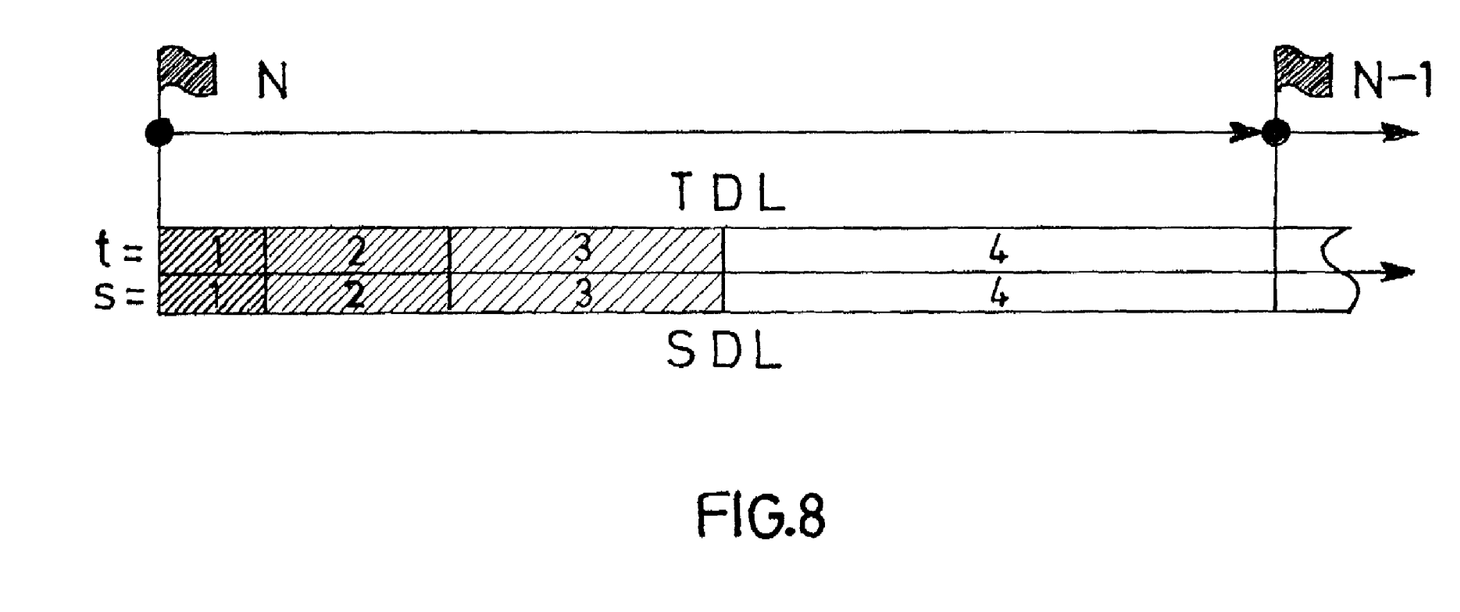
FIG. 8 shows the hierarchical organization of the bitstream without resolution flags.

A trade-off must be found between full resolution scalability and arithmetic coding efficiency. To this end, an intermediate solution, which provides four levels of spatial and temporal scalabilities, is proposed. The minimal frame rate rate$_{min}$ is always associated with the minimal display size (S$^x$min, S$^y$min), to constitute the first resolution level. As well 2*rate$_{min}$ is combined with the display size (2*S$^x$min, 2*S$^y$min) etc. FIG. 8 illustrates this when there are four resolution levels in the decomposition of the group of frames (GOF). All the combinations that were previously possible (16 possibilities with 4 spatial levels and four temporal levels) are now restricted to four.

The invention claimed is:

1. An encoding method for the compression of a video sequence divided in groups of frames decomposed by means of a three-dimensional (3D) wavelet transform leading to a given number of successive resolution levels corresponding to the decomposition levels of said transform, said method being based on a hierarchical subband encoding process leading from the original set of picture elements (pixels) of each group of frames to transform coefficients constituting a hierarchical pyramid, and a spatio-temporal orientation tree —in which the roots are formed with the pixels of the approximation subband resulting from the 3D wavelet transform and the offspring of each of these pixels is formed with the pixels of the higher subbands corresponding to the image volume defined by these root pixels—defining the spatio-temporal relationship inside said hierarchical pyramid, said encoding method comprising the steps of:

(A) preserving the initial subband structure of the 3D wavelet transform by scanning the subbands one after the other in an order that respects the parent-offspring dependencies formed in said spatio-temporal tree;

(B) adding "off/on" flags to each coefficient of the spatio-temporal tree in view of a progressive transmission of the most significant bits of the coefficients, these flags being such that at least one of them describes the state of significance of a set of pixels and at least another one describes the state of significance of a single pixel, wherein two flags describe the state of significance of a set of pixels and are, for each coefficient (x,y,z) of said spatio-temporal tree:

FS1 if D(x,y,z) is still insignificant;
FS2 if L(x,y,z) is still insignificant;

where D(x,y,z) is the set of coordinates of all the descendants of the node (x,y,z) and L(x,y,z)=D(x,y,z)−O(x,y,z), with O(x,y,z) is the set of coordinates of the direct offspring of the node (x,y,z), and two flags describe the state of significance of a single pixel and are:

FP3 if the current pixel is significant;
FP4 if it is not significant or if its significance is to be analyzed.

2. The encoding method according to claim 1, wherein for each bitplane, the tree scanning is spatially oriented, all the temporal resolutions being successively scanned inside each spatial scale and resolution flags being introduced between any two spatial scales.

3. The encoding method according to claim 1, wherein for each bitplane, the tree scanning is temporally oriented, all the spatial resolutions being successively scanned inside each temporal scale and resolution flags being introduced between any two temporal scales.

4. The encoding method according to claim 1, wherein for each bitplane, an intermediate tree scanning is performed, all the temporal and spatial resolutions of the same scale being jointly scanned and resolution flags being introduced between any two spatial/temporal scales.

5. The encoding method according to claim 1, wherein the exploration of the spatio-temporal tree, implemented in said scanning order, includes, after an initialization step where the flag FP4 is put to all the coefficients of the lowest spatio-temporal subband and the flag FS1 to 7 over 8 coefficients of said lowest spatio-temporal subband, and the maximum significance level MSL is calculated, the following steps, carried out from the bitplane n =MSL down to the bitplane n =0 and from the lowest subband resolution down to the highest one:

---

(a) a first set of tests related to the set significance;
   (1) if the flag FS1 is "on", then output S$_n$ (D(x,y,z)):
      if S$_n$ (D(x,y,z)) = 1, then:
         for each (x',y',z') in O(x,y,z), put flag FP4;
         remove flag FS1 from (x,y,z);
         if L(x,y,z) not empty, then put flag FS2.
   (2) if flag FS2 is "on", then output S$_n$ (L(x,y,z)):
      if S$_n$ (L(x,y,z)) = 1, then:
         for each (x',y',z') in O(x,y,z), put flag FS1;
         remove flag FS2 from (x,y,z).
(b) a second set of tests related to the pixel significance:
   (1) if the flag FP3 is "on", then output = the n-th bit of (x,y,z);
   (2) if the flag FP4 is "on", then output S$_n$ (x,y,z):
      if S$_n$(x,y,z) = 1, then:
         put flag FP3 "on";
         output sign (x,y,z);
         and remove flag FP4.

---

6. The encoding method according to claim 1 further comprising the step of:

partially decoding the bitstream between two resolution flags, leading to a lower resolution/frame rate reconstructed video sequence.

7. The encoding method according to claim 6, wherein the context used for the encoding of each bit related to the set significance in an arithmetic coding module is built using the bits of the same bitplane of the last scanned neighboring wavelet coefficients in the same spatio-temporal subband, these bits being the bits output during the first set of tests related to the set significance.

8. The encoding method according to claim 6, wherein the context used for the encoding of each bit related to the pixel significance in an arithmetic coding module is built using the bits of the same bitplane of the last scanned neighboring wavelet coefficients in the same spatio-temporal subband, these bits being 1 if the neighboring coefficients are marked by an FP3 flag and 0 if not.

9. An encoding system for the compression of a video sequence divided in groups of frames decomposed by means of a three-dimensional (3D) wavelet transform leading to a given number of successive resolution levels corresponding to the decomposition levels of said transform, said method being based on a hierarchical subband encoding process leading from the original set of picture elements (pixels) of each group of frames to transform coefficients constituting a hierarchical pyramid, and a spatio-temporal orientation tree —in which the roots are formed with the pixels of the approximation subband resulting from the 3D wavelet transform and the offspring of each of these pixels is formed with the pixels of the higher subbands corresponding to the image volume defined by these root pixels defining the spatio-temporal relationship inside said hierarchical pyramid, said encoding system comprising:

a processor in communication with a memory, said processor executing code for:

(A) preserving the initial subband structure of the 3D wavelet transform by scanning the subbands one after the other in an order that respects the parent-offspring dependencies formed in said spatio-temporal tree; and (B) adding "off/on" flags to each coefficient of the spatio-temporal tree in view of a progressive transmission of the most significant bits of the coefficients, these flags being such that at least one of them describes the state of significance of a set of pixels and at least another one describes the state of significance of a single pixel, wherein two flags describe the state of significance of a set of pixels and are, for each coefficient (x,y,z) of said spatio-temporal tree:

FS1 if D(x,y,z) is still insignificant;
FS2 if L(x,y,z) is still insignificant;

where D(x,y,z) is the set of coordinates of all the descendants of the node (x,y,z) and L(x,y,z) =D(x,y,z) −O(x,y,z), with O(x,y,z) is the set of coordinates of the direct offspring of the node (x,y,z), and two flags describe the state of significance of a single pixel and are:

FP3 if the current pixel is significant;
FP4 if it is not significant or if its significance is to be analyzed.

10. The system as recited in claim 9, wherein said code is stored in said memory.

11. The system as recited in claim 9, further comprising:
an input/output device in communication with said processor and said memory.

* * * * *